(12) United States Patent
Takihiro et al.

(10) Patent No.: US 7,339,931 B2
(45) Date of Patent: Mar. 4, 2008

(54) PACKET TRANSFER APPARATUS CONNECTABLE WITH MOBILE TERMINALS

(75) Inventors: Masatoshi Takihiro, Yokohama (JP); Tetsuro Yoshimoto, Kokubunji (JP); Eri Kawai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1038 days.

(21) Appl. No.: 10/356,535

(22) Filed: Feb. 3, 2003

(65) Prior Publication Data
US 2004/0109452 A1 Jun. 10, 2004

(30) Foreign Application Priority Data
Dec. 10, 2002 (JP) ............... 2002-357810

(51) Int. Cl.
*H04L 12/28* (2006.01)
*H04L 12/56* (2006.01)
(52) U.S. Cl. .................................... 370/392
(58) Field of Classification Search ........ 370/392–396, 370/401, 403, 469, 389–395, 229, 409, 400, 370/256, 406, 455, 461, 255, 466, 474, 428, 370/236, 248; 709/229, 218, 223, 243; 455/445, 455/73, 552, 91, 426, 11.1
See application file for complete search history.

(56) References Cited

U.S. PATENT DOCUMENTS 6,118,771 A * 9/2000 Tajika et al. ............... 370/328

2005/0090262 A1 * 4/2005 Hamano et al. ............ 455/445

FOREIGN PATENT DOCUMENTS

JP 2002-135289 10/2000

OTHER PUBLICATIONS

David C. Plummer, "An Ethernet Address Resolution Protocol or Converting Netwrk Protocol Addresses to 48 bit Ethernet Address for Transmission on Ethernet Hardware", Network Working Group, (Dec. 2002), pp. 1-9.

* cited by examiner

*Primary Examiner*—Wing Chan
*Assistant Examiner*—Prenell Jones
(74) *Attorney, Agent, or Firm*—Reed Smith LLP; Stanley P. Fisher, Esq.; Juan Carlos A. Marquez, Esq.

(57) ABSTRACT

A packet transfer apparatus connected to an internal subnetwork formed by a set of broadcast segments each accommodating terminals and for transferring, when a MAC frame including a IP address which designates a destination terminal connected to one of the segments is received from a terminal connected to another segment in the internal subnetwork, an IP packet in the MAC frame to the segment connected to the destination terminal in accordance with a terminal management table which indicates a relation of address information of each of the terminals belonging to the internal subnetwork and the segment to which the terminal is connected.

10 Claims, 15 Drawing Sheets

FIG. 3

TERMINAL MANAGEMENT TABLE 30

| MAC ADDRESS | IP ADDRESS | SEGMENT IDENTIFIER | |
|---|---|---|---|
| xx:xx:xx:xx:xx | 192.168.0.2 | INF1 (3a) | 30-1 |
| yy:yy:yy:yy:yy | 192.168.0.3 | INF2 (3b) | 30-2 |
| zz:zz:zz:zz:zz | 192.168.0.4 | INF3 (3c) | 30-3 |
| ⋮ | ⋮ | ⋮ | ⋮ |

FIG. 4

ROUTING TABLE 40

| DESTINATION PREFIX | NEXT HOP | OUTGOING SEGMENT IDENTIFIER | |
|---|---|---|---|
| 198.168.0.0/24 | Connected | (MULTI-SEGMENT) | 40-1 |
| 198.168.2.0/24 | 192.168.1.254 | INF4 (2a) | 40-2 |
| 198.168.3.0/24 | 192.168.1.254 | INF4 (2a) | 40-3 |
| ⋮ | ⋮ | ⋮ | ⋮ |

FIG. 5

ARP TABLE 50

| IP ADDRESS 51 | MAC ADDRESS 52 | AGING TIMER 53 | |
|---|---|---|---|
| 192.168.0.2 | xx:xx:xx:xx:xx | 300 | ~50-1 |
| 192.168.0.3 | yy:yy:yy:yy:yy | 250 | ~50-2 |
| 192.168.0.4 | zz:zz:zz:zz:zz | 300 | ~50-3 |
| ⋮ | ⋮ | ⋮ | ⋮ |

FIG. 14

MAC TRANSFER TABLE  60

| MAC ADDRESS | SEGMENT IDENTIFIER | AGING TIMER | |
|---|---|---|---|
| xx:xx:xx:xx:xx:xx | INF1 | INFINITE | 60-1 |
| yy:yy:yy:yy:yy:yy | INF2 | 300 | 60-2 |
| zz:zz:zz:zz:zz:zz | INF3 | 300 | 60-3 |
| ⋮ | ⋮ | ⋮ | ⋮ |

61 — MAC ADDRESS
62 — SEGMENT IDENTIFIER
63 — AGING TIMER

FIG. 15

DEFAULT ROUTER MANAGEMENT TABLE  80

| MAC ADDRESS | IP ADDRESS | DEFAULT ROUTER | |
|---|---|---|---|
| xx:xx:xx:xx:xx | 192.168.0.2 | 10A | 80-1 |
| yy:yy:yy:yy:yy | 192.168.0.3 | 10A | 80-2 |
| zz:zz:zz:zz:zz | 192.168.0.4 | 10A | 80-3 |
| ⋮ | ⋮ | ⋮ | ⋮ |

81 — MAC ADDRESS
82 — IP ADDRESS
83 — DEFAULT ROUTER

PACKET TRANSFER APPARATUS CONNECTABLE WITH MOBILE TERMINALS

BACKGROUND OF THE INVENTION

(1) Field of the Invention

The present invention relates to a packet transfer apparatus and, more particularly, to a packet transfer apparatus connecting a plurality of broadcast segments allowing movement of communication terminals among the segments.

(2) Description of the Related Art

In an IP network, for example, a plurality of broadcast segments constructed by the Ethernet (registered trademark) or the like are connected to each other via a packet transfer apparatus called an L3 switch or a router. In this case, each of the broadcast segments corresponds to a network unit generally called a subnetwork.

The address of each subnetwork is expressed as, for example, "192.168.0.0/24". A numerical sequence "192.168.0.0" expresses the value of an address part of 32 bits and the value of address bits is described in a decimal of 0 to 255 on a byte unit basis The 32-bit address part is comprised of a first bit group indicative of the address of the subnetwork and a second bit group indicative of a host address. The numerical value "24" after the slant mark denotes the number of bits of a subnet mask.

In the example, the value "192.168.0" of upper 24 bits (three bytes) of the address part specified by the subnet mask denotes the subnetwork address and the lowest one byte indicates the host address. The host address is used as an identifier of each of terminals belonging to a subnetwork. When an IP packet is received from a subnetwork, the router recognizes the destination subnetwork from the subnetwork address part of the destination IP address included in an IP header and transfers the received packet to an output port corresponding to a segment connected to the destination subnetwork.

To each terminal, an IP address having, in its upper-bits part, the same address value as that of the subnetwork to which the terminal is connected is assigned. When the terminal moves from a home subnetwork to another subnetwork, the IP address of the terminal has to be changed. For example, in the case where the Ethernet is used for a data link layer, the subnetwork corresponds to a broadcast segment of the Ethernet. Therefore, when a terminal moves from one broadcast segment to another broadcast segment, the IP address of the terminal has to be changed.

Usually, the subnetwork is defined in consideration of requirements on network management such as separation of traffic and security. For example, in many cases, a subnetwork is defined for each room or floor of an office building and used as an independent broadcast segment. In recent years, laptop personal computers and mobile terminals being small, light, and easy-to-carry are spread as terminals of an IP network. Further, as a wireless LAN is becoming practically used, it is becoming easier to connect a mobile terminal to a network at a movement destination of a terminal user.

Under such circumstances, there is an increasing demand for communication service such that each terminal is allowed to move among subnetworks (or broadcast segments) without changing the terminal IP address and the terminal user can easily use a network at a destination. To facilitate use of a network at a destination of a terminal user, there are known, for example, following network configurations.

(1) A network configuration in which the scale of a subnetwork (broadcast segment) is enlarged and the range of a terminal movement, for example, the whole area of an office building is covered by one subnetwork. In this configuration, a plurality of radio access points are located in the same subnetwork.

According to the network configuration, since each terminal can be connected to the same subnetwork at every destination, it is unnecessary to change the terminal IP address and the IP address of a default router. In the configuration, however, since all of terminals are connected to the same broadcast segment, traffic is concentrated on the same network and it causes a problem such that an available bandwidth for each terminal becomes short. In addition, broadcast traffic reaches all of terminals, so that assurance of security is insufficient.

(2) A network configuration employing a mobile IP specified by RFC2002 of IETF. In a mobile IP, a subnetwork serving a mobile terminal as a home link is provided with a home agent (HA) function and a link at a destination of the mobile terminal movement is provided with a foreign agent (FA) function. When a terminal moves to a subnetwork out of the home link, the relation between the home address of the terminal and a care-of-address (CoA) obtained from the present subnetwork at the destination is notified to the home agent HA (registration of the terminal position).

A source terminal of IP packets designates a home address of a receiver terminal in a destination address field of each of the IP packets to be sent. The IP packets are captured by the home agent HA. The home agent HA encapsulates the IP packet with an IP header having a care-of-address corresponding to the home address as a destination address, and transmits the encapsulated IP packet to a subnetwork where the receiver terminal exists. The encapsulated packet is decapsulated by the foreign agent FA, and the resultant packet is transferred to the receiver terminal. In the mobile IP, therefore, each terminal has to have a mobile IP function of performing position registration from a visited subnetwork where the terminal exists now to the home agent HA.

(3) A network configuration of a host address routing type as proposed in, for example, Japanese Patent Publication No. 2002-135289, in which a router detected movement of a terminal broadcasts the IP address of the moved terminal to the other router, thereby changing the contents of a routing table of each router in association with movement of terminals.

According to the configuration, each terminal can always use the same IP address. However, each of the routers in a network has to hold and update path information of all of the terminals, and the load for path control on the network increases. This configuration, therefore, requires to suppress the changes in the network configuration as much as possible and to suppress the load of the path control by, for example, performing path control on a subnetwork unit basis.

SUMMARY OF THE INVENTION

An object of the invention is to provide a packet transfer apparatus enabling communications among terminals without changing a terminal IP address at a visited subnetwork.

Another object of the invention is to provide a packet transfer apparatus capable of allowing terminals to move among a plurality of segments.

Further another object of the invention is to provide a packet transfer apparatus capable of increasing the number of segments in a movement range of a terminal.

In order to achieve the objects, a packet transfer apparatus of the invention forms one subnetwork by a plurality of broadcast segments and allows each terminal to use the same IP address in a visited segment within the subnetwork.

Generally, a subnetwork managed by a router is comprised of a single broadcast segment. In this case, a conventional router can specify a subnetwork to which a destination terminal belongs by means of, for example, an IP path control function, and broadcast an ARP (Address Resolution Protocol) request message defined by RFC826 to the subnetwork, thereby obtaining a MAC address of a destination terminal and converting a received IP packet to a MAC frame.

However, when one subnetwork is formed by a plurality of broadcast segments, a segment to which the ARP request message should be broadcasted cannot be unconditionally specified from the destination IP address of the received packet. Consequently, the packet transfer apparatus of the invention specifies a segment to which the ARP request message and a MAC frame including the received IP packet are to be transferred with reference to a table (hereinbelow, called a terminal management table) indicating the relation of the MAC address and the IP address of a terminal and a segment to which the terminal is connected.

That is, a packet transfer apparatus of the invention is provided with a packet transfer control unit for transferring IP packets among a plurality of broadcast segments, and an internal subnetwork having one subnetwork address is formed by a set of broadcast segments among the plurality of broadcast segments each accommodating a plurality of terminals.

More specifically, the packet transfer control unit comprises a terminal management table for storing a plurality of entries each indicating a corresponding relation of a MAC address and an IP address of a terminal belonging to the internal subnetwork and an identifier of a segment to which the terminal is connected, and means for transferring by referring to the terminal management table, when a MAC frame designating a destination terminal connected to one of segments in the internal subnetwork by a destination IP address is received from a source terminal connected to another segment in the internal subnetwork, an IP packet in the received frame to the segment to which the destination terminal is connected.

The registration of an entry into the terminal management table can be automatically performed in association with allocation of an address to a terminal in accordance with, for example, a DHCP (Dynamic Host Configuration Protocol) defined by RFC2131. In the case of fixedly allocating an IP address to each terminal, entries can be set manually.

Another feature of the invention resides in the packet transfer apparatus comprising means for determining by referring to the terminal management table, when an address request message inquiring a MAC address of a destination terminal by designating a destination IP address is received from a source terminal connected to one of segments in the internal subnetwork, whether the segment connected to the destination terminal and a segment having received the address request message are the same, and transmitting in place of the destination terminal, in the case where the two segments are different from each other, a response message including an IP address of the destination terminal and the MAC address of the router to the segment to which the source terminal is connected.

As described above, by sending the requested MAC address from the packet transfer apparatus by proxy of the destination terminal and capturing a MAC frame including the IP packet for the terminal connected to another segment by the packet transfer apparatus, the present invention can transfer the MAC frame to the segment connected to the destination terminal in accordance with the terminal management table.

Another feature of the invention resides in that the packet transfer apparatus further comprises table updating means for collating, when a MAC frame is received from a source terminal connected to one of segments in the internal subnetwork, a first segment having received the MAC frame with a second segment whose identifier is indicated in one of entries stored in the terminal management table in correspondence with the MAC address of the source terminal of the MAC frame, and changing the identifier of the second segment stored in the terminal management table to that of the first segment when the two segments do not match with each other, by judging that the source terminal is moved within the internal subnetwork.

As described above, by updating the terminal management table in accordance with movement of a terminal, each terminal is allowed to move among segments without changing network parameters such as a terminal IP address at a destination and an IP address of a default transfer apparatus.

According to an embodiment of the invention, the table updating means includes means for transmitting, when the first segment and the second segment are not the same, a confirmation message destined to the source address of the MAC frame to both of the first and second segments and determining whether the identifier of the second segment stored in the terminal management table has to be updated or not in accordance with a reception state of a response to the confirmation message in both of the segments.

With respect to a subnetwork comprised of a plurality of broadcast segments, it is described as, for example, "VLAN aggregation for efficient IP address allocation" in RFC3069. However, the prior art is directed to save IP addresses to be allocated to terminals and is not directed to the movement of a terminal among segments.

A packet transfer apparatus according to the invention is further characterized by including: a connection line for communicating a MAC frame with an adjacent packet transfer apparatus being in joint relation; a packet transfer control unit for transferring, when a MAC frame including a destination MAC address designating the packet transfer apparatus and a destination IP address designating a destination terminal connected to another segment in the internal subnetwork is received from a source terminal connected to one of segments in the internal subnetwork, an IP packet in the received frame to a segment to which the destination terminal is connected; and a MAC frame transfer control unit for transferring, when a MAC frame is received from a source terminal associated with the adjacent packet transfer apparatus as its default apparatus via one of the segments in the internal subnetwork, the received MAC frame to the connection line connected to the adjacent packet transfer apparatus.

In this case, the packet control unit controls the transfer of IP packets among the segments in the internal subnetwork in accordance with the terminal management table, and the MAC frame transfer control unit controls the transfer of a MAC frame to the adjacent packet transfer apparatus in accordance with a MAC transfer table in which a plurality of entries each indicating a corresponding relation between a MAC address and an identifier of a segment to which the terminal is connected are stored.

The MAC frame transfer control unit transfers the MAC frame to the adjacent packet transfer apparatus and registers an entry for the source terminal into the MAC transfer table after confirming that the default apparatus of the source terminal is the adjacent packet transfer apparatus when an entry corresponding to the source terminal of the received MAC frame is not registered in the MAC transfer table, subjecting received MAC frames of which destination MAC address is a MAC address of an apparatus other than the packet transfer apparatus.

As described above, by providing the packet transfer apparatus with the function of communicating a MAC frame with the adjacent packet transfer apparatus being in a joint relation, each terminal can be allowed to move among segments in a subnetwork under the default apparatus and moreover to a subnetwork under the adjacent packet transfer apparatus.

In the packet transfer apparatus of the invention, the packet transfer control unit comprises: a routing table in which a plurality of entries each indicating routing control information corresponding to the address of one of the subnetworks are registered, an entry corresponding to the address of the internal subnetwork registered in the routing table including a segment identifier indicating that the internal subnetwork is comprised of a plurality of segments, and means for specifying by referring to the routing table and the terminal management table, when an IP packet destined to a terminal belonging to the internal subnetwork is received from a segment connected to an external subnetwork, a segment to which a destination terminal is connected, thereby to transfer the received packet to the segment.

Other objects and features of the invention will become apparent from embodiments described hereinbelow.

BRIEF DESCRIPTION OF THE DRAWINGS

FIG. 3 is a diagram showing the contents of a terminal management table 30 in the router 10.

FIG. 4 is a diagram showing the contents of a routing table 40 in the router 10.

FIG. 5 is a diagram showing the contents of an ARP table 50 in the router 10.

FIG. 14 is a diagram showing the contents of a MAC transfer table 60 in the router 10 of the second embodiment.

FIG. 15 is a diagram showing the contents of a default router management table in a default router management server 8 in FIG. 12.

DESCRIPTION OF THE PREFERRED EMBODIMENTS

Embodiments of the invention will be described hereinbelow with reference to the drawings.

Figure 1:
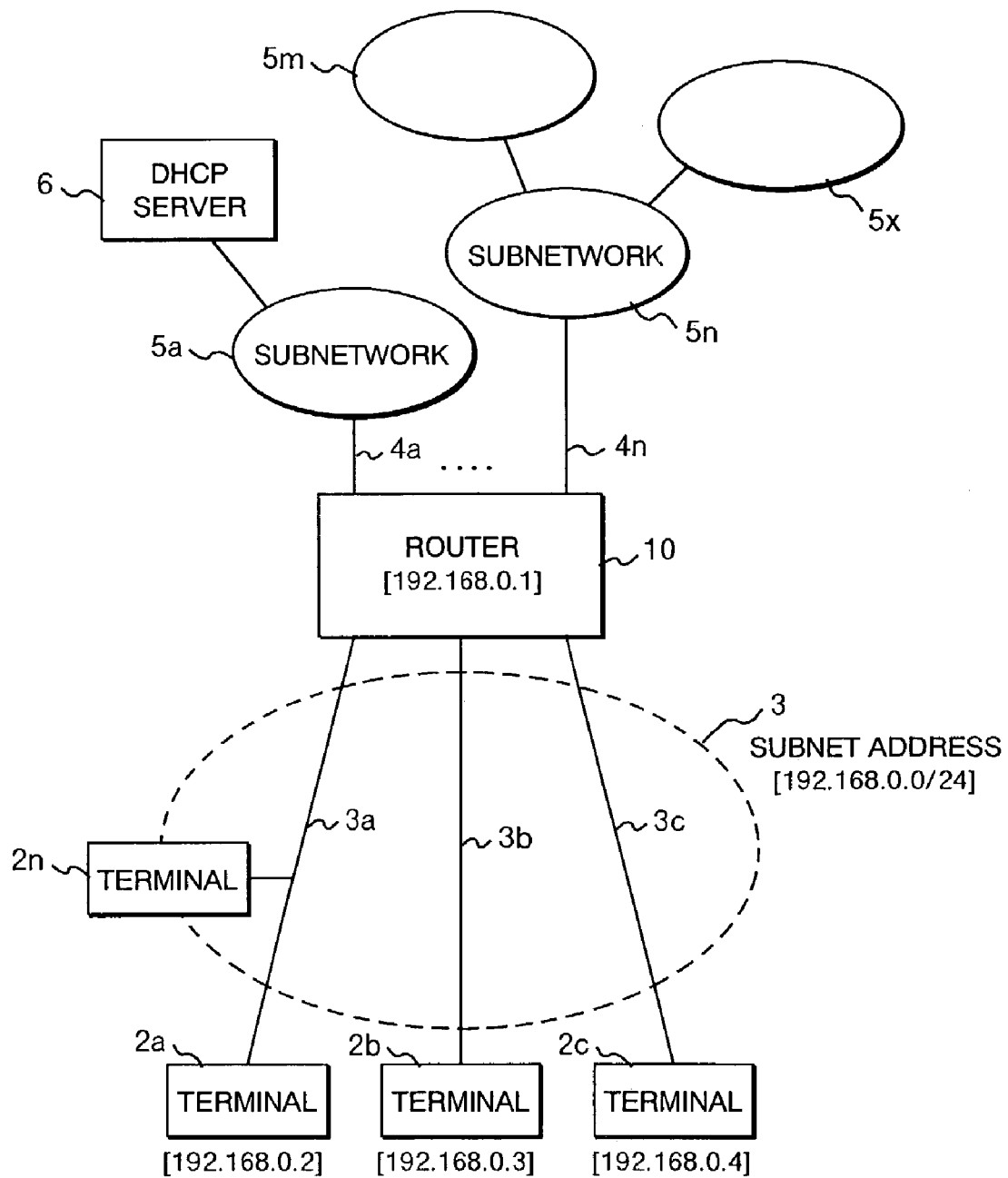
FIG. 1 is a schematic diagram showing an example of a network configuration to which a router of the invention is applied.

FIG. 1 is a schematic diagram of a network to which a packet transfer apparatus (hereinbelow, called a "router" 10 inclusive of a layer 3 switch) according to a first embodiment of the invention is applied.

The function of the router 10 will be described here in the case where the Ethernet is employed for a data link layer of an internal subnetwork of the IP network. The router 10 connects an internal subnetwork 3 and external networks 5 (subnetworks 5a to 5n) and relays IP packets among the subnetworks. The address of the internal subnetwork 3 is, as shown in the diagram, "192.168.0.0/24".

In the embodiment, the internal subnetwork 3 is comprised of a plurality of broadcast segments (connection lines) 3a, 3b, and 3c to each of which a plurality of terminals can be connected. For simplicity, FIG. 1 shows terminals 2a and 2n connected to the segment 3a and terminals 2b and 2c connected to the segments 3b and 3c, respectively. The IP addresses of the terminals 2a, 2b, and 2c are "192.168.0.2", "192.168.0.3", and "192.168.0.4", respectively. Upper 24 bits of each of the IP addresses coincide with a prefix part "192.168.0" of the subnetwork address specified by mask bits.

In the router 10, the IP address of an interface connected with the subnetwork 3 is "192.168.0.1" and the terminals 2a to 2c use the address "192.168.0.1" as an IP address of a default router. The terminals communicate IP packets with terminals connected to the external networks 5 which are the subnetworks 5a to 5n in the example of the diagram and terminals connected to other subnetworks such as 5m and 5x coupled to the external subnetworks 5a to 5n, by using the default router as their relay router.

As understood from the relation of the IP addresses, one of the features of the embodiment is that the internal subnetwork 3 is constructed by a plurality of segments 3a, 3b, and 3c.

The external network 5 is comprised of an IP subnetwork for an arbitrary use such as LAN (Local Area Network), enterprise backbone network, or the Internet. Reference numeral 6 denotes a DHCP (Dynamic Host Configuration Protocol) server connected to the subnetwork 5a. The DHCP server 6 is used to automatically allocate a terminal IP address and a default router IP address to each terminal and its operation will be described in detail later.

Figure 2:
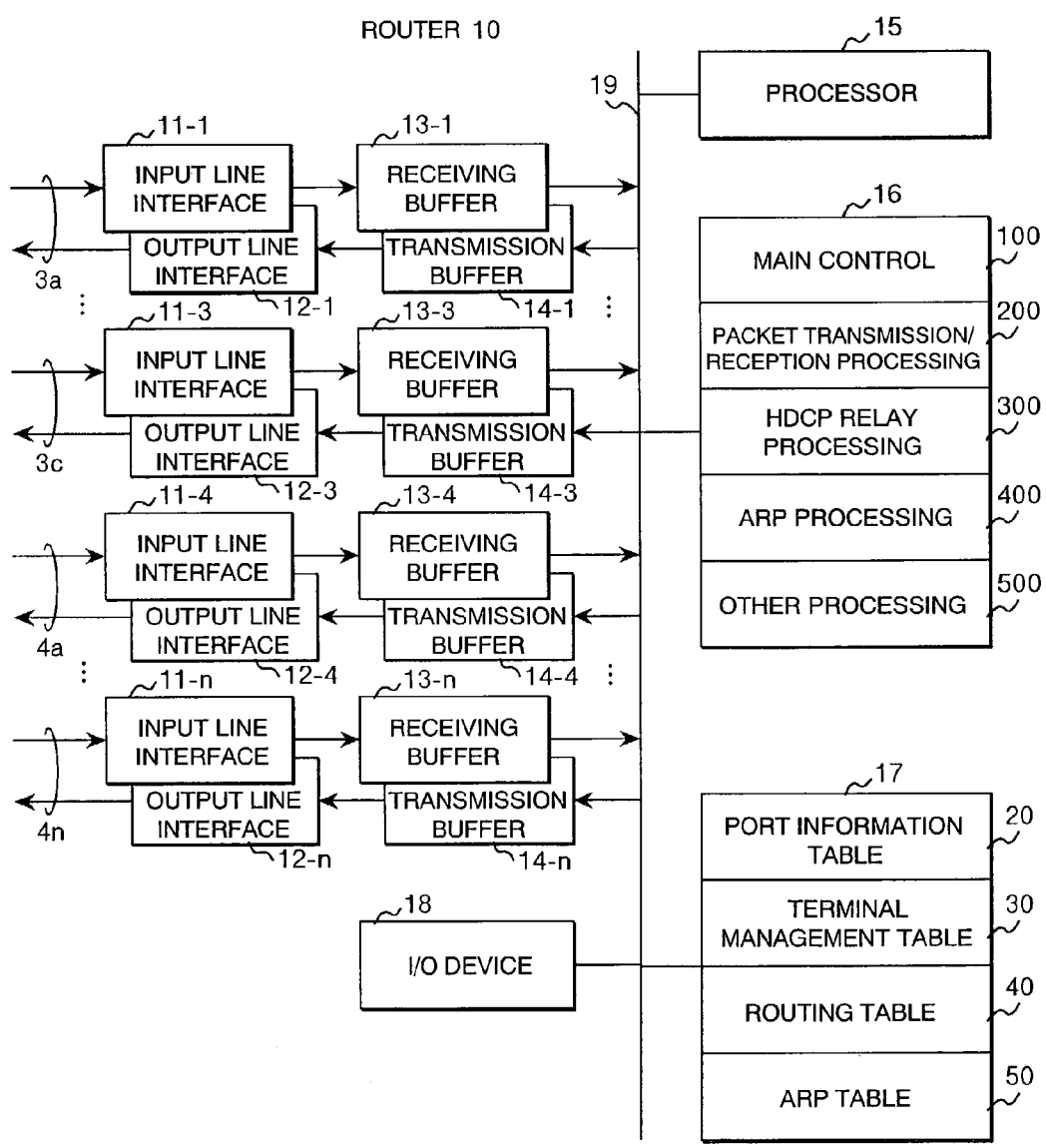
FIG. 2 is a block diagram showing a first embodiment of a router 10 of the invention.

FIG. 2 is a block diagram of the router 10 according to the invention.

The router 10 comprises: input line interfaces 11-1 to 11-3 and output line interfaces 12-1 to 12-3 for accommodating the plurality of segments 3a, 3b, and 3c constructing the internal subnetwork 3; input line interfaces 11-4 to 11-n and output line interfaces 12-4 to 12-n for accommodating the segments 4a to 4n connected to the external subnetworks 5a to 5n; receiving buffers 13 (13-1 to 13-n) each connected between one of the input line interfaces and an internal bus 19; transmission buffers 14 (14-1 to 14-n) each connected between one of the output line interfaces and the internal bus 19; a processor 15 connected to the internal bus 19; a program memory 16; a data memory 17; and an input/output device 18 for an operator.

The program memory 16 stores, as programs executed by the processor 15, a packet transmission/reception processing routine 200, an HDCP relay processing routine 300 having a terminal information management function, an ARP (Address Resolution Protocol) processing routine 400 applications and other processing routines 500, and a main control routine 100 for selectively activating the routines. In the data memory 17, a port information table 20, a terminal management table 30, a routing table 40, an ARP table 50, and other data areas are formed.

The port information table 20 shows a corresponding relation between the identifier of an input/output port (input/output line interfaces 11 and 12) of the router 10 and the type of a segment connected to the port. The segment type in this case is either a multi-segment type or a general type. The multi-segment type denotes a segment sharing one subnetwork address with the other segments like the multicast segments 3a to 3c in FIG. 1. The general type denotes a segment connected to an individual subnetwork having a unique subnetwork address like the segments 4a to 4n.

The terminal management table 30 comprises, as shown in FIG. 3, a plurality of entries 30-1, 30-2, . . . each indicating the relation of a MAC address 31 and an IP address 32 of a terminal, which belongs to the internal subnetwork 3 and is associated with the router 10 as its default router, and an identifier 33 of a segment to which the terminal is connected.

The routing table 40 comprises, as shown in FIG. 4, a plurality of entries 40-1, 40-2, . . . each indicating the relation of a destination prefix 41, a next hop 42, and an outgoing segment (output port) identifier 43. The destination prefix 41 indicates the address of a destination subnetwork and the next hop 42 indicates the IP address of a relay router toward the destination subnetwork.

For example, in the case where "connected" is written as the next hop 42 as in the entry 40-1, it means that the destination subnetwork indicated by the destination prefix 41 is directly connected to the router. The outgoing segment identifier 43 indicates the identifier of a segment (output port) to which the router indicated by the next hop 42 is connected. When the subnetwork indicated by the destination prefix 41 is comprised of a plurality of segments like the internal subnetwork 3 in FIG. 1, an identification code indicating that the subnetwork is of a multi-segment type is set as the outgoing segment identifier 43.

The ARP table 50 comprises, as shown in FIG. 5, a plurality of entries 50-1, 50-2, . . . each indicating the relation of an IP address 51 and a MAC address 52 assigned to each terminal and an aging timer value 53 indicative of the entry expiry.

In a conventional IP network, each of subnetworks connected to a router is consists of one broadcast segment. In this case, the router can unconditionally specify a segment to which a destination terminal is connected from the destination IP address of a received packet.

On the other hand, as shown in FIG. 1, when one subnetwork 3 is comprised of a plurality of broadcast segments 3a, 3b, and 3c, a segment to which a destination terminal is connected cannot be unconditionally specified from the destination IP address. The terminal management table 30 is referred to in order to identify a segment connected to a destination terminal based on the destination MAC address or destination IP address of a received frame. The registration of an entry to the terminal management table 30 is carried out, for example, when an IP address is allocated to a terminal by the DHCP server 6.

Figure 6:
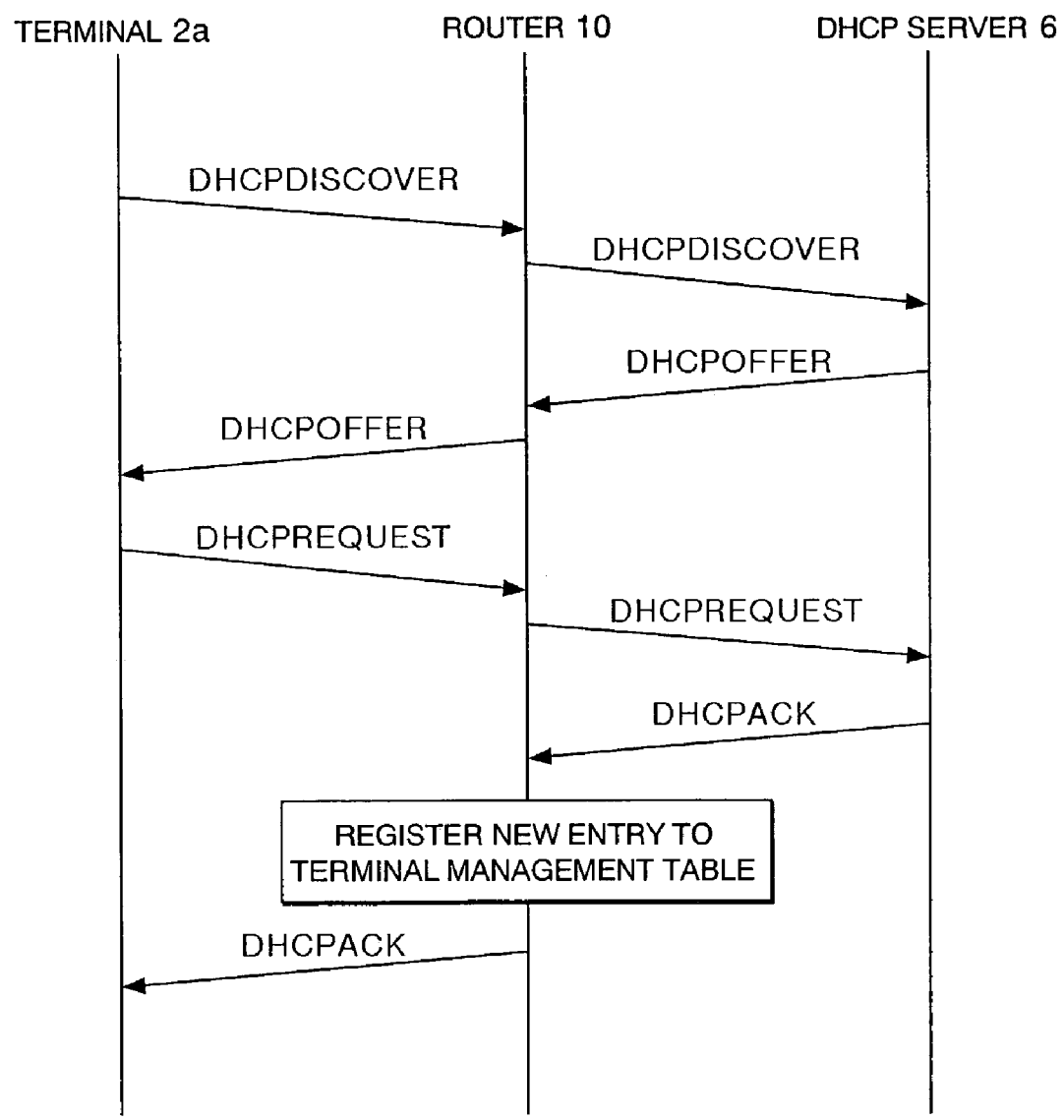
FIG. 6 is a diagram showing a sequence of allocating an IP address to a terminal by a DHCP server 6.

FIG. 6 shows a sequence of allocating an IP address to a terminal by the DHCP server 6.

Figure 7:
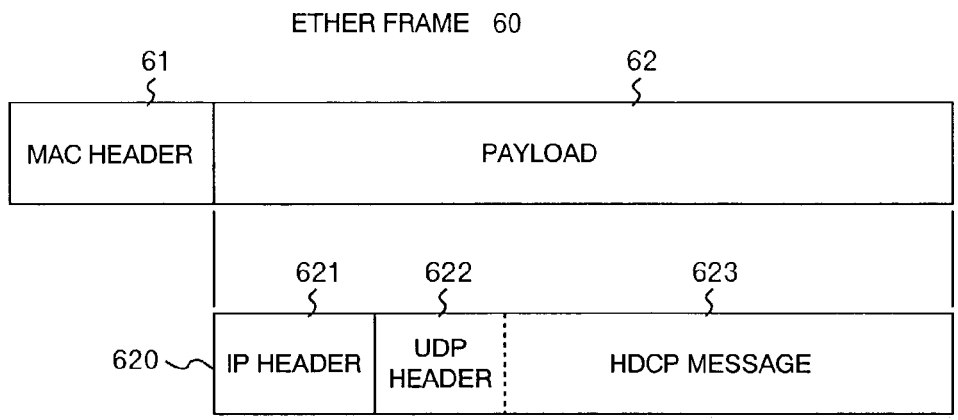
FIG. 7 is a diagram showing the format of an Ethernet frame.

For example, when a user activates a terminal 2a, the terminal 2a broadcasts a control message "DHCPDISCOVER" for detecting a DHCP server to the segment 3a. The DHCP control message DHCPDISCOVER is transmitted, for example, in an Ethernet frame (registered trademark) 60 format shown in FIG. 7 to the broadcast segment 3a.

The Ethernet frame 60 is comprised of a MAC header 61 and a payload 62, and the payload 62 includes an TP packet 620 which is comprised of an IP header 621, a UDP header 622, and an HDCP control message (in the example, DHCPDISCOVER message) 623.

In the case of transmitting the DHCPDISCOVER message, the terminal 2 a sets a broadcast address as the destination IP address of the IP header 621, zero as a transmission source IP address, a MAC broadcast address as the destination address of the MAC frame header 61, and the MAC address of the terminal 2a as the source address.

When the Ethernet frame is received, the router 10 specifies a higher-layer program routine for processing the received message based on the contents of the UDP header and transfers the received frame to the HDCP relay processing routine 300. When the Ethernet frame 60 including the HDCP control message is received, the HDCP relay processing routine 300 extracts the IP packet 620 from the received frame and rewrites the source IP address in the IP header 621 to the IP address of the router. After that, the router 10 transfers the resultant IP packet to a line 4a connected to the subnetwork 5a to which the DHCP server 6 belongs.

When the IP packet including the HDCP control message DHCPDISCOVER is received from the subnetwork 5a, the DHCP server 6 determines an IP address to be allocated to a requester terminal, and generates a response message "DHCPOFFER" indicative of the allocated IP address. The response message DHCPOFFER is transmitted to the router 10 in a form of an IP packet which includes the IP address of the DHCP server 6 as the source IP address. The router 10 processes the IP packet including the response message DHCPOFFER by the HDCP relay processing routine 300 and transfers the response message in a form of an Ethernet frame to the segment 3a.

When the response message DHCPOFFER is received, the terminal 2a transmits an HDCP control message "DHCPREQUEST" for requesting acknowledgement of IP address allocation to the DHCP server. The DHCPREQUEST message is sent out, in a manner similar to the DHCPDISCOVER message, in a form of the broadcast MAC frame to the segment 3a. The router 10 transfers the DHCPREQUEST message to the DHCP server 6 after rewriting the source IP address.

When the DHCPREQUEST message is received, the DHCP server 6 generates an HDCP control message "DHCPACK" for replying an acknowledgement response and transmits the message in a form of an IP packet to the router

10. The router 10 processes the IP packet including the response message DHCPACK by the HDCP relay processing routine 300 and transfers the response message in a form of an Ethernet frame to the segment 3*a*. When the DHCPACK message is received by the terminal 4*a*, the sequence of IP address allocation is completed.

During the process of transferring the HDCP control message, the HDCP relay processing routine 300 recognizes the corresponding relation among the MAC address of a terminal included in the Ethernet frame header 61, the IP address allocated to the terminal, and the identifier of a segment which receives the Ethernet frame, and register a new entry corresponding to the IP address requester terminal 2*a* in the terminal management table 30 when the DHCPACK message is transferred to the segment 3*a*.

In the case of allocating an IP address to each terminal as a fixed address, the manager of the router 10 may register all entries of the terminal management table 30 by manual operations via the input/output device 18.

The IP packet relaying operation by the router 10 of the invention and a proxy response operation to an ARP request will now be described. First, packet communication between two terminals belonging to the same internal subnetwork 3 will be described.

In a conventional network configuration in which all of terminals belonging to one subnetwork are connected to the same broadcast segment, packets can be communicated directly among all the terminals belonging to the subnetwork, so that packet relay through the router is unnecessary.

In the conventional network configuration, for example, when a terminal X performs communication with a terminal Y, in order to obtain the MAC address of the terminal Y, the terminal X broadcasts an ARP request message designating the IP address of the terminal Y to a broadcast segment. In response to reception of the ARP request message, the terminal Y sends a response message indicative of a pair of the MAC address and the IP address of the terminal Y to the requester terminal X. By applying the MAC address indicated in the response message as a destination address, the terminal X can transmit a data packet in a form of a MAC frame to the terminal Y.

In the network configuration shown in FIG. 1, however, since the internal subnetwork 3 is of the multi-segment type, two terminals performing communication through the internal subnetwork are not always belonging to the same broadcast segment. Consequently, for example, there is a case such that, like communication between the terminals 2*a* and 2*n* connected to the same segment, the destination terminal 2*n* can receive an ARP request message broadcasted to the segment 3*a* by the terminal 2*a* and send a response message to the requester terminal. There is also a case such that, like communication between the terminals 2*a* and 2*b*, an ARP request message broadcasted to the segment 3*a* by the terminal 2*a* cannot be received by the destination terminal 2*b* because the terminals 2*a* and 2*b* are connected to different segments from each other.

According to the invention, in the case where the terminal X as the source of the ARP request message and the destination terminal Y which should respond to the ARP message are belonging to different segments from each other, the router 10 performs the operation of responding to the ARP request in place of the destination terminal Y.

For example, in the network of FIG. 1, when the terminal 2*a* transmits an ARP request message designating the IP address of the terminal 2*b* to the broadcast segment 3*a*, the router 10 replies a response message indicative of the IP address of the terminal 2*b* and the MAC address of the router 10 by proxy of the terminal 2*b*. In this case, the terminal 2*a* recognizes that the destination terminal 2*b* has responded, so that the terminal 2*a* transmits data (IP packet) destined to the terminal 2*b* in a form of the Ethernet frame applying the MAC address of the router 10 as a destination address.

Upon receiving the Ethernet frame from the terminal 2*a*, the router 10 extracts the IP packet from the received frame and performs transferring of the received IP packet in accordance with the destination IP address. In the example, since the destination IP address of the received packet is that of the terminal 2*b*, by referring to the routing table 40, the router 10 recognizes that the subnetwork to which the destination terminal 2*b* belongs is the multi-segment type subnetwork directly connected to the router 10, and retrieves an entry of which IP address 32 matches with the destination IP address from the terminal management table 30.

As a result of the table search, the MAC address 31 of the destination terminal 2*b* and an identifier of a connection segment (segment identifier) 33 are found. Consequently, the router 10 can transfer the received packet in a form of the MAC (Ethernet) frame to the port (transmission buffer 14-2) specified by the segment identifier corresponding to the destination terminal 2*b*.

The function of the router 10 of responding to the ARP request message as a proxy of a terminal is generally called a proxy ARP. On reception of the ARP request message, the router 10 of the invention executes the ARP processing routine 400 shown in FIG. 8.

In the ARP processing routine 400, the router 10.determines whether an entry corresponding to a source terminal (source MAC address) of the ARP request message is registered in the terminal management table 30 or not (401). If the source terminal is not registered in the terminal management table 30, the routine is finished without performing any operation.

If the source terminal is registered in the terminal management table 30, the router 10 retrieves an entry of which IP address 32 matches with the destination IP address designated by the ARP request message from the terminal management table 30 and compares the segment, to which the destination terminal indicated by the segment identifier 33 of the entry is connected, with the segment (input port) having received the ARP request message (402). When the two segments are the same, it is determined that the destination terminal can respond to the ARP request message and the routine is finished without sending a proxy response from the router 10.

When the two segments are different from each other, a response message indicative of the IP address of the destination terminal and the MAC address of the router 10 is generated and the response message is transmitted to an output port corresponding to the segment having received the ARP request message (403) and the routine is finished.

Since the router 10 of the invention manages the IP addresses of all terminals connected to the internal subnetwork 3 with the terminal management table 30, as described above, by allowing the router to select terminals each having a registered entry in the terminal management table 30 as objects of Proxy ARP, transmission of packets to and from a terminal of which location is unknown can be inhibited.

In the case of sending a packet from a terminal 2*a* connected to the internal subnetwork 3 of the multi-segment type to a terminal Y connected to the external network 5, the terminal 2*a* transmits an Ethernet frame including an IP packet destined to the terminal Y to the router 10 designated as a default router of the terminal 2*a*. The router 10 extracts the IP packet from the received Ethernet frame, retrieves an entry corresponding to the destination IP address of the received IP packet from the routing table 40, and transfers the received IP packet in accordance with the next hop 42 and the outgoing segment identifier 43.

In the case of receiving an IP packet destined to the terminal 2a from the external network 5, the router 10 retrieves an entry corresponding to the destination IP of the received IP packet from the routing table 40. In this case, it is determined from the next hop 42 and the outgoing segment identifier 43 of the retrieved entry that the subnetwork to which the destination terminal belongs is of the multi-segment type connected to the router 10. The router 10 therefore retrieves an entry corresponding to the destination IP address from the terminal management table 30 and transfers the received IP packet to the output port indicated by the segment identifier 33.

The operation of the router 10 in the case where a terminal moves in the internal subnetwork 3 will now be described.

The broadcast segments 3a to 3c shown in FIG. 1 are arranged, for example, so as to be individual segments in different floors or rooms in a building. It is convenient for each terminal user if he or she can move from a present place to another room or floor and connect his or her terminal to a broadcast segment there to communication with a server or other terminals.

With the network configuration of the invention, even when the terminal moves to any of the broadcast segments 3a to 3c, the IP subnetwork 3 to which the terminal belongs is unchanged, so that it is unnecessary to change the IP address of the terminal and the default router address.

For example, in FIG. 1, even when the terminal 2a moves from the present segment 3a to the adjacent segment 3b, the subnetwork to which the terminal 2a is connected at the destination is the network 3 having an address "192.168.0.0/24" which is the same as that of the network before the movement. Therefore, even if the terminal moves among the broadcast segments 3a to 3c, it is unnecessary to change the IP address "192.168.0.2" of the terminal 2a and the IP address "192.168.0.1" of the default router.

As described above, by constructing one internal subnetwork by a plurality of broadcast segments, even if the terminal moves among segments of the internal subnetwork, it is possible to allow each terminal to perform network communication at a destination without changing the terminal IP address and the default router address. Therefore, with the network configuration of the invention, a burden to change the setting of terminal parameters by the user is lessened and continuous communication throughout a movement can be realized.

The router 10 of the invention updates an entry in the terminal management table 30 in response to the first Ethernet frame transmitted from the terminal at a destination. To update the terminal management table, for example, an Ethernet frame including a data packet of communication continued before the movement, an Ethernet frame in newly started communication, an authentication Ethernet frame transmitted when a terminal is connected to a broadcast segment at a destination, an Ethernet frame periodically transmitted from a terminal application, and the like can be applied.

The Ethernet frame transmitted from a terminal may include not necessarily an IP packet but, for example, an ARP message or a NetBEUI communication packet used for Microsoft Windows.

Figure 9:
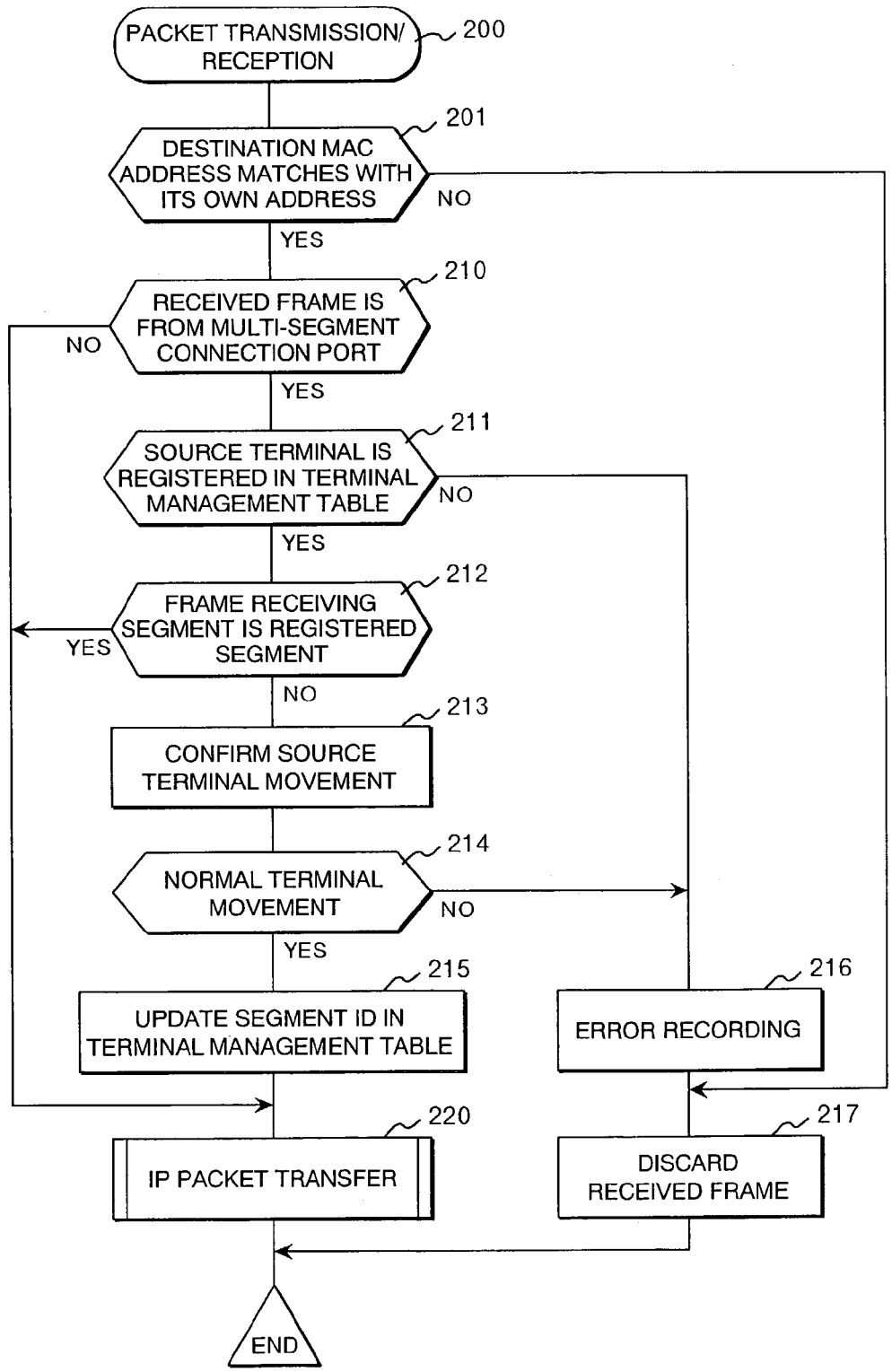
FIG. 9 is a flowchart showing an example of a packet transmission/reception processing routine 200 executed by the router 10.

FIG. 9 shows a flowchart of the packet transmission/reception processing routine 200 executed by the router 10.

Received frames stored in the receiving buffers 13-1 to 13-n are sequentially read out by the main control routine 100 and received frames other than the HDCP control message and the ARP request message are processed by the packet transmission/reception processing routine 200.

In the packet transmission/reception processing routine 200, the router 10 checks the destination MAC address of a received frame (201), discards the received frame when the destination MAC address does not match with the address of the router 10 itself (217), and finishes the routine. The frame discard based on the determination of the destination MAC address may be performed by the input line interfaces 11-1 to 11-n.

When the destination MAC address of a received frame matches with the router address, an input port of the received frame is checked (210). In the case where the input port of the received frame (Ethernet frame) is a multi-segment connection port, that is, when the received frame is a frame read out from any of the receiving buffers 13-1 to 13-3, the router determines whether the MAC address or IP address of the source terminal is registered in the terminal management table 30 or not (211).

Figure 10:
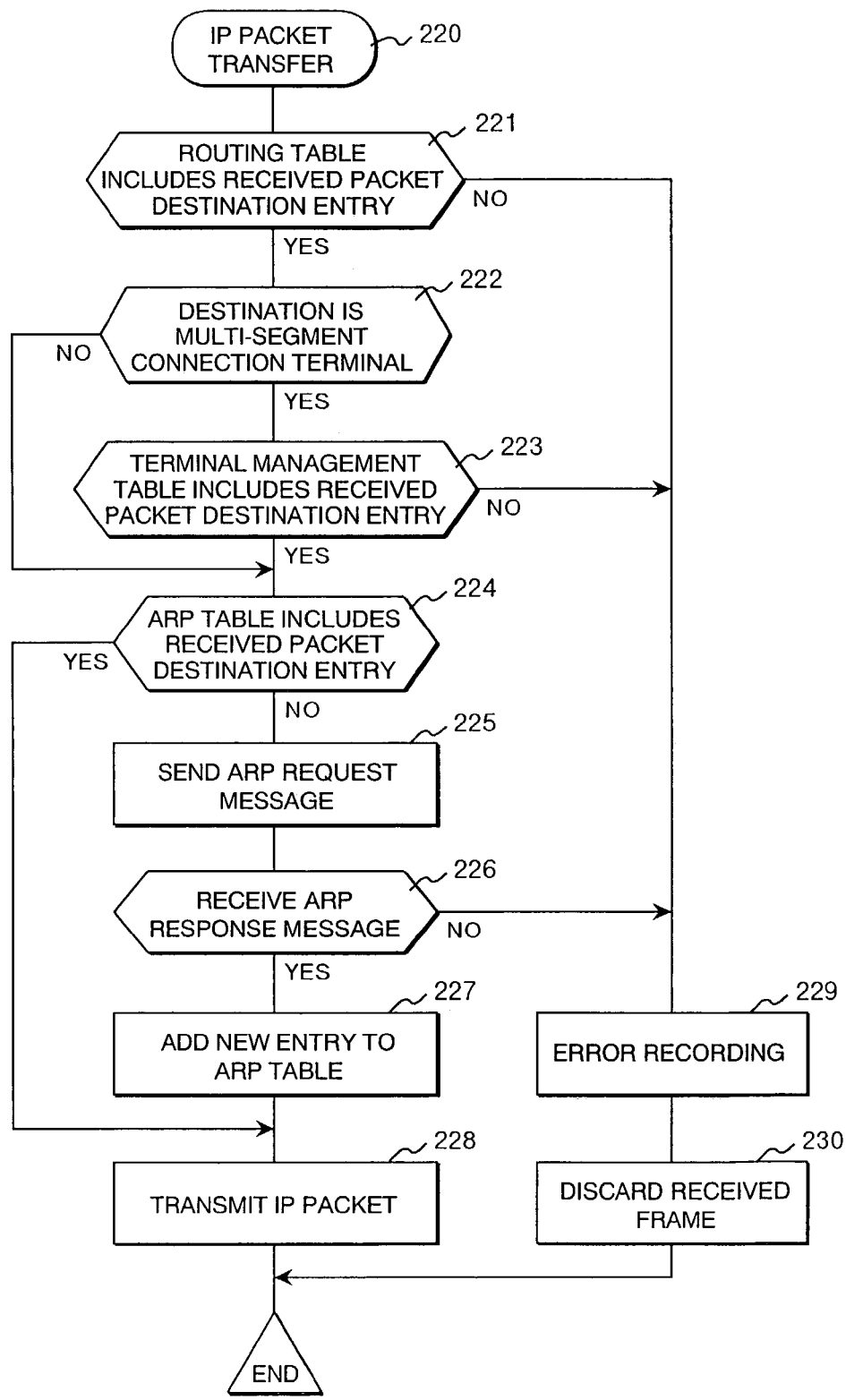
FIG. 10 is a flowchart showing the details of an IP packet transfer processing 220 in FIG. 9.

In the case where the input port of the received frame is a port other than the multi-segment connection port, that is, the received frame is a frame received from an external subnetwork connection segment and read out from one of the receiving buffers 13-4 to 13-n, an IP packet transfer processing 220 which will be described later by referring to FIG. 10 is executed.

If it is proved that an entry corresponding to the source terminal is not registered yet in the terminal management table 30 as a result of the determination in step 211, the router judges that the received frame is transmitted from an unauthorized terminal connected to the internal subnetwork. In this case, after recording error log information (216), the received frame is discarded (217) and the routine is finished.

If it is proved that the entry corresponding to the transmission source has been registered in the terminal management table 30, the router checks whether the identifier of the input port (receiving segment) of the received frame matches with the segment identifier 33 registered in the terminal management table 30 or not (212). When the two identifiers match with each other, the router judges that there is no movement as to the source terminal of the received frame and it is therefore unnecessary to update the terminal management table 30. In this case, the IP packet transfer processing 220 is executed on the IP packet extracted from the received frame.

When the identifier of the frame reception segment does not match with the segment identifier 33 registered in the terminal management table 30, the router judges that the source terminal of the received frame has moved within the internal network In this case, confirmation of the source terminal movement (213) is executed.

Movement of a terminal is confirmed by generating a confirmation frame (Ping frame) which includes, as a destination, the MAC address 31 of the source terminal registered in the terminal management table 30, transmitting the confirmation frame to both of an original segment, which has been coupled with the terminal before the terminal movement and is indicated by the segment identifier 33, and a visited segment which is coupled with the terminal after the terminal movement at a destination and corresponding to the input port of the received frame, and detecting whether a response frame is received or not from each of the segments.

When the terminal moves among the segments, it is assumed that the terminal responds to the Ping frame only in the visited segment. If there is no response to the Ping frame in the visited segment, it can be judged that abnormality occurs in the source terminal. If a response to the Ping frame is also received from the original segment, it means occurrence of such an abnormal state that terminals having the same MAC address exist in two places. In the case where there is an abnormality in movement of the source terminal of the received frame as a result of the terminal movement confirmation processing (214), after recording error log information (216), the received frame is discarded (217), and the routine is finished.

When there is no response in the original segment and a response is received from the visited segment only, it is confirmed the terminal movement is normal At this time, the segment identifier 33 of the entry corresponding to the source terminal registered in the terminal management table 30 is rewritten to the identifier of the visited segment (215) and the IP packet transfer processing 220 is executed on the IP packet extracted from the received frame.

FIG. 10 shows a flowchart showing the details of the IP packet transfer processing 220.

In the IP packet transfer processing 220, an entry corresponding to the destination address of the received IP packet is retrieved from the routing table 40 (221). If there is no entry corresponding to the destination address, after error recording (229), the received packet is discarded (230), and the routine is finished.

If there is an entry corresponding to the destination address in the routing table 40, the router determines whether the destination terminal is a terminal connected to the internal subnetwork of the multi-segment type or not based on the value of the outgoing segment identifier 43 (222). If the destination terminal is a terminal connected to the internal subnetwork of the multi-segment type, with reference to the terminal management table 30, the router determines whether the entry corresponding to the destination IP address has been registered or not (223). If the entry is not registered, after error recording (229), the received packet is discarded (230) and the routine is finished.

In the case where the destination terminal is a terminal connected to a normal segment or is a terminal of which entry is confirmed to be registered in the terminal management table 30 in step 223, with reference to the ARP table 50, the router determines whether the entry corresponding to the destination IP address has been registered in the ARP table 50 or not (224). If the entry has been registered, the IP packet transfer is carried out (228).

In the IP packet transfer (228), by applying the MAC address registered in the ARP table 50 as a destination MAC address, the router generates a MAC frame including the received IP packet and transfers the MAC frame to the connection port of a destination terminal indicated by the outgoing segment identifier 43 in the routing table 40 or indicated by the segment identifier 33 in the terminal management table 30.

If the entry corresponding to the destination IP address has not been registered in the ARP table 50, an ARP request message for obtaining the MAC address of the destination terminal is generated and transmitted to the connection port of a destination terminal indicated by the outgoing segment identifier 43 in the routing table 40 or indicated by the segment identifier 33 in the terminal management table 30 (225). The router waits for a response to the ARP request message if there is no response within predetermined time, after error recording (229), the received packet is discarded (230), and the routine is finished.

In the case where the response message to the ARP request is received, an ARP information entry for the destination terminal is generated according to the contents of the response message and added to the ARP table 50 (227) and, after that, the IP packet transfer (228) is executed.

Figure 11:
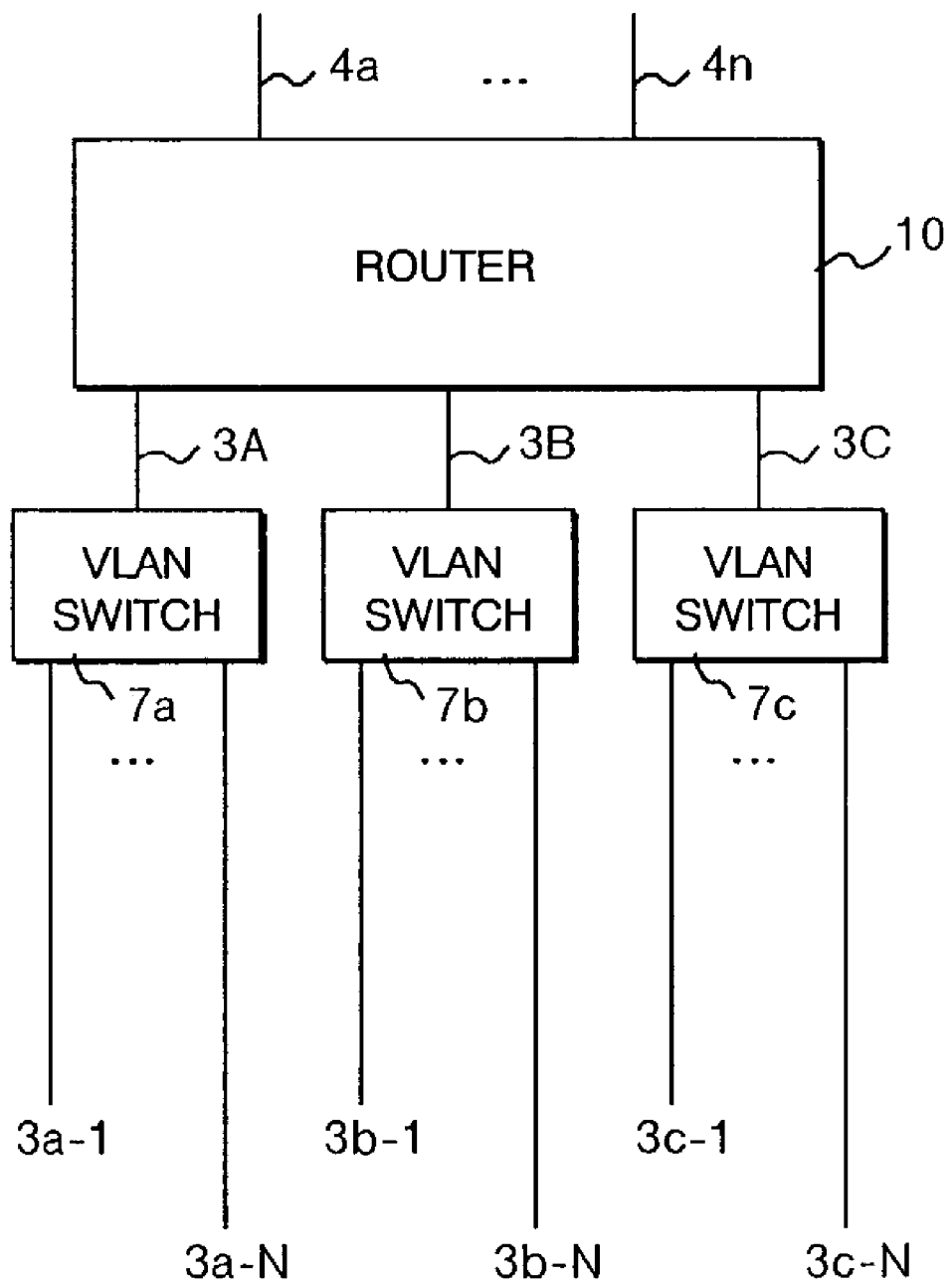
FIG. 11 is a diagram showing an example of a router structure suitable for increasing the scale of a subnetwork having a multi-segment structure.

FIG. 11 shows an example of a router configuration suitable to expand the range of movement of a terminal by increasing the number of segments included in the subnetwork 3 of the multi-segment type.

In the example, VLAN switches (7a to 7c) are connected to the input/output ports 3A to 3C (input line interfaces 11-1 to 11-3 and output line interfaces 12-1 to 12-3) for multi-segment connection of the router 10. To the VLAN switches 7a to 7c, a plurality of multi-cast segments 3a-1 to 3a-N, 3b-1 to 3b-N, and 3c-1 to 3c-N are connected, respectively.

The VLAN switch 7a has the function of collecting the plurality of physical lines 3a-1 to 3a-N as multi-cast segments and performing logical multiplexing/demultiplexing of transmission frames between the physical lines and the input/output port 3A. By multiplexing a plurality of lines by the VLAN, a number of broadcast segments can be connected to a small number of input/output ports provided by the router 10. The VLAN is standardized in the IEEE802.1Q standard.

Figure 12:
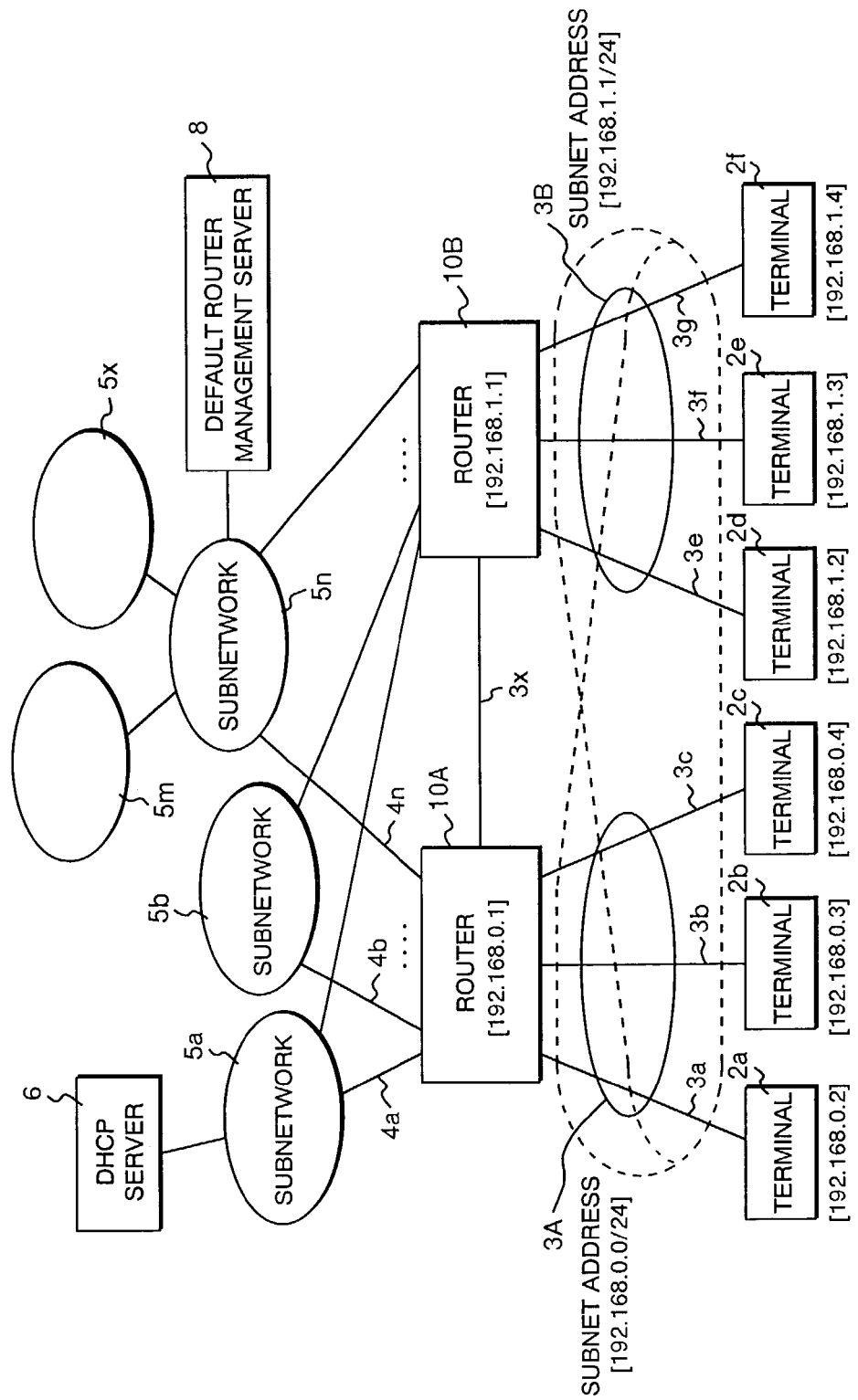
FIG. 12 is a schematic diagram showing another example of a network configuration to which a router according to the invention is applied.

FIG. 12 is a schematic diagram of a network to which a router as a second embodiment of the invention is applied.

In the second embodiment, by connecting a plurality of routers each accommodating a subnetwork of the multi-segment structure, movement of the terminal among the subnetworks can be permitted without changing the IP address of a terminal.

In FIG. 12, a router 10A is a default router (a default gateway having an IP address "192.168.0.1") of an IP subnetwork 3A having a network address "192.168.0.0/24". A router 10B is a default router (a default gateway having an IP address "192.168.1.1") of an IP subnetwork 3B having a network address "192.168.1.0/24".

The router 10A accommodates a terminal 2a (IP address "192.168.0.2"), a terminal 2b (IP address "192.168.0.3"), and a terminal 2c (IP address "192.168.0.4") belonging to the IP subnetwork 3A via the broadcast segments 3a, 3b, and 3c, respectively.

The router 10B accommodates a terminal 2d (IP address "192.168.1.2"), a terminal 2e (IP address "192.168.1.3"), and a terminal 2f (IP address "192.168.1.4") belonging to the IP subnetwork 3B via the broadcast segments 3d, 3e, and 3f, respectively.

The routers 10A and 10B are connected to each other via a line 3x through which, as will be described later, an Ethernet frame received from a terminal moved in from another subnetwork is communicated to each other.

In a manner similar to the first embodiment, each terminal accesses the DHCP server 6 via the router 10A or 10B at the time of activation and receives allocation of the IP address corresponding to an IP subnetwork in which the router connected to the terminal serves as a default gateway. In the embodiment, for example, the router 10A or 10B accesses a default router management server 8 connected to the subnetwork 5n in order to obtain address information of each of terminals connected to the other router.

In order to hold the address information of each of the terminals connected to the routers 10A and 10B, the default router management server 8 has, for example, a default router management table 80 shown in FIG. 15. The default router management table 80 is comprised of a plurality of entries 80-1, 80-2, . . . each indicating the relation of a MAC address 81 and an IP address 82 of a terminal and an identifier 83 of a default router (default gateway) of the terminal.

When a new entry for a terminal is registered in its terminal management table 30, the router 10A or 10B notifies the default router management server 8 of the MAC address 31 and the IP address 32 of the terminal and an identifier of the router itself. The default router management server 8 generates a new entry **80-*i* from the notified information and registers the new entry 80-*i* to the default router management table 80**.

Figure 13:
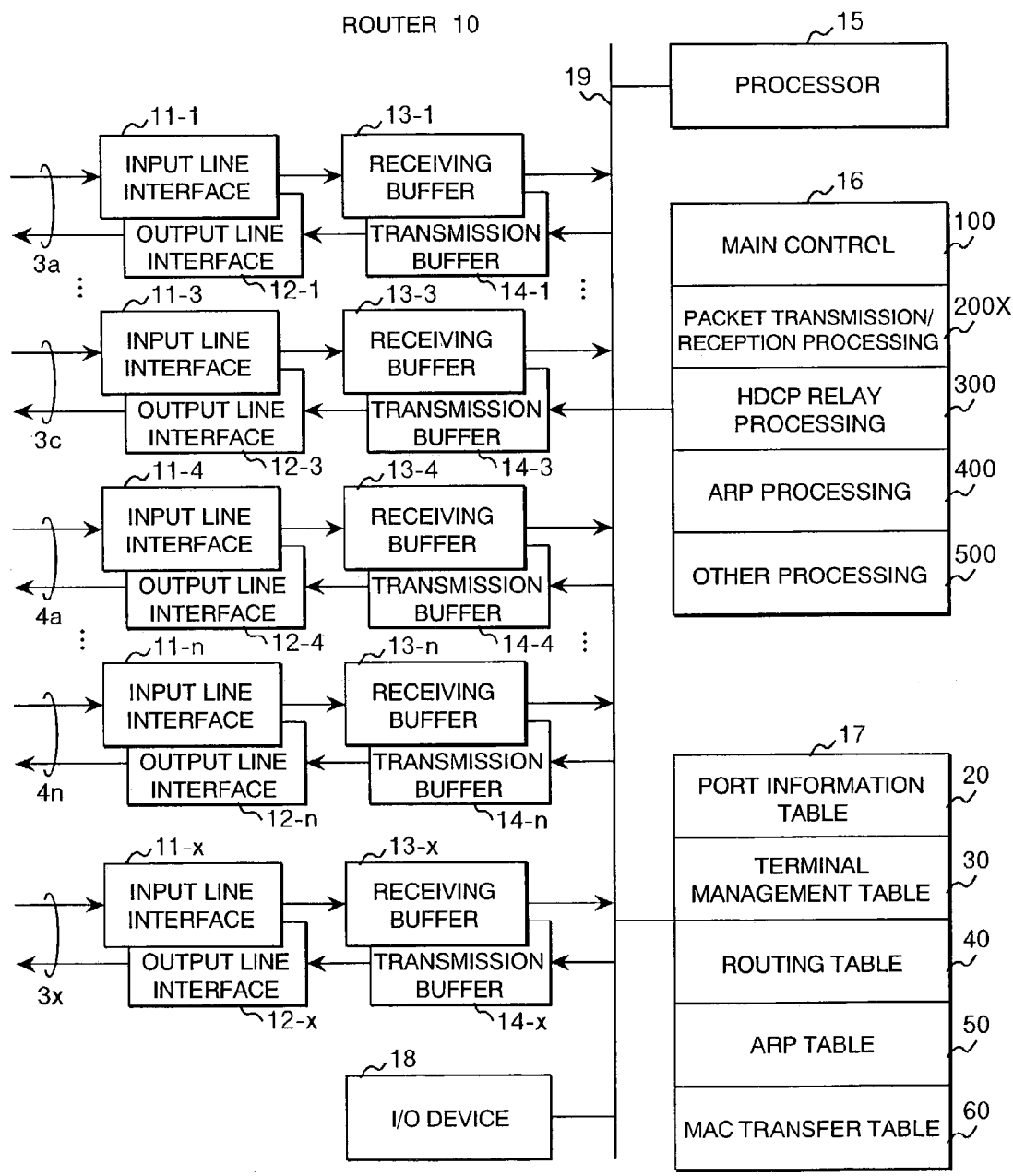
FIG. 13 is a block diagram showing a second embodiment of the router 10 according to the invention.

FIG. 13 shows the configuration of the router 10 (10A, 10B) of the second embodiment.

The router 10 of the second embodiment is obtained by adding to the router 10 of the first embodiment shown in FIG. 2, an input line interface **11-*x* and an output line interface 12-*x* connected to the line 3*x*, a receiving buffer 13-*x* and a transmission buffer 14-*x* between the interfaces 11-*x* and 12-*x* and the bus 19, a MAC transfer table 60 to the memory 17, and a new function to a packet transmission/reception processing routine 200X**.

The MAC transfer table 60 is comprised of, as shown in FIG. 14, a plurality of entries 60-1, 60-2, . . . , each indicating a MAC address 61 of each of terminals and a default router, an identifier 62 of a segment to which the terminal or the default router is connected, and an aging timer value 63 indicative of expiry of the entry. An entry for the default router is registered by manager's manual operations at the time of system configuration. As the segment identifier 62 of an entry for the default router, the identifier of the line **3*x* is set. The aging timer value 63** of the entry for the default router has a special value which is not subjected to time limitation.

The packet transmission/reception processing routine 200X in the embodiment is provided with, in addition to the IP packet transfer function based on the routing table 40, a function of relaying an Ethernet frame by using the MAC transfer table 60. The Ethernet frame relay function is used when a terminal moves among default routers (default gateways) as will be described later.

For example, in FIG. 12, when the terminal **2*a* moves from the segment 3*a* to the segment 3*b* or 3*c* in the same subnetwork, the router 10A operates similarly to the router 10 of the first embodiment. When the terminal 2*a* moves from the segment 3*a* belonging to the subnetwork 3A to any of the segments 3*d* to 3*f* belonging to another subnetwork 3B, since it is terminal movement among different default routers (subnetworks), the routers 10A and 10B** require a special function which is not provided in the first embodiment.

Figure 16:
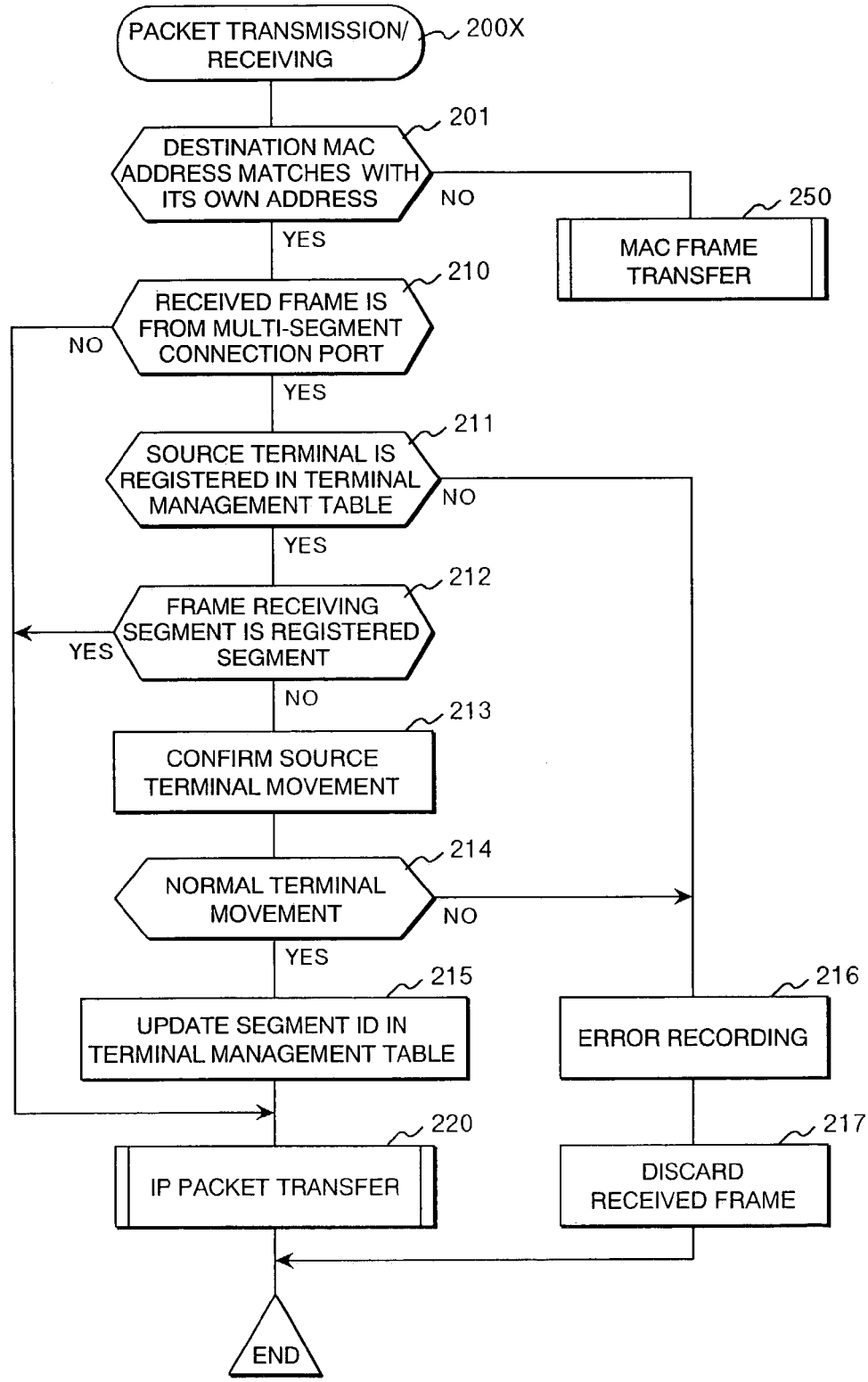
FIG. 16 is a flowchart of a packet transmission/reception processing routine 200X executed by the router 10 of the second embodiment.

FIG. 16 shows a flowchart of the packet -transmission/reception processing routine 200X executed by the router 10A (or 10B) of the second embodiment of the invention.

In the packet transmission/reception processing routine 200X, the router 10A checks a destination MAC address of a received frame (201). If the destination MAC address matches with the MAC address of the router 10A, a reception port of the frame is checked (210). After that, processing steps 211 to 220 similar to those of the packet transmission/reception processing routine 200 of the first embodiment are executed. If the destination MAC address of the received frame does not match with the MAC address of the router 10A, a MAC frame transfer processing 250 is executed.

Figure 17:
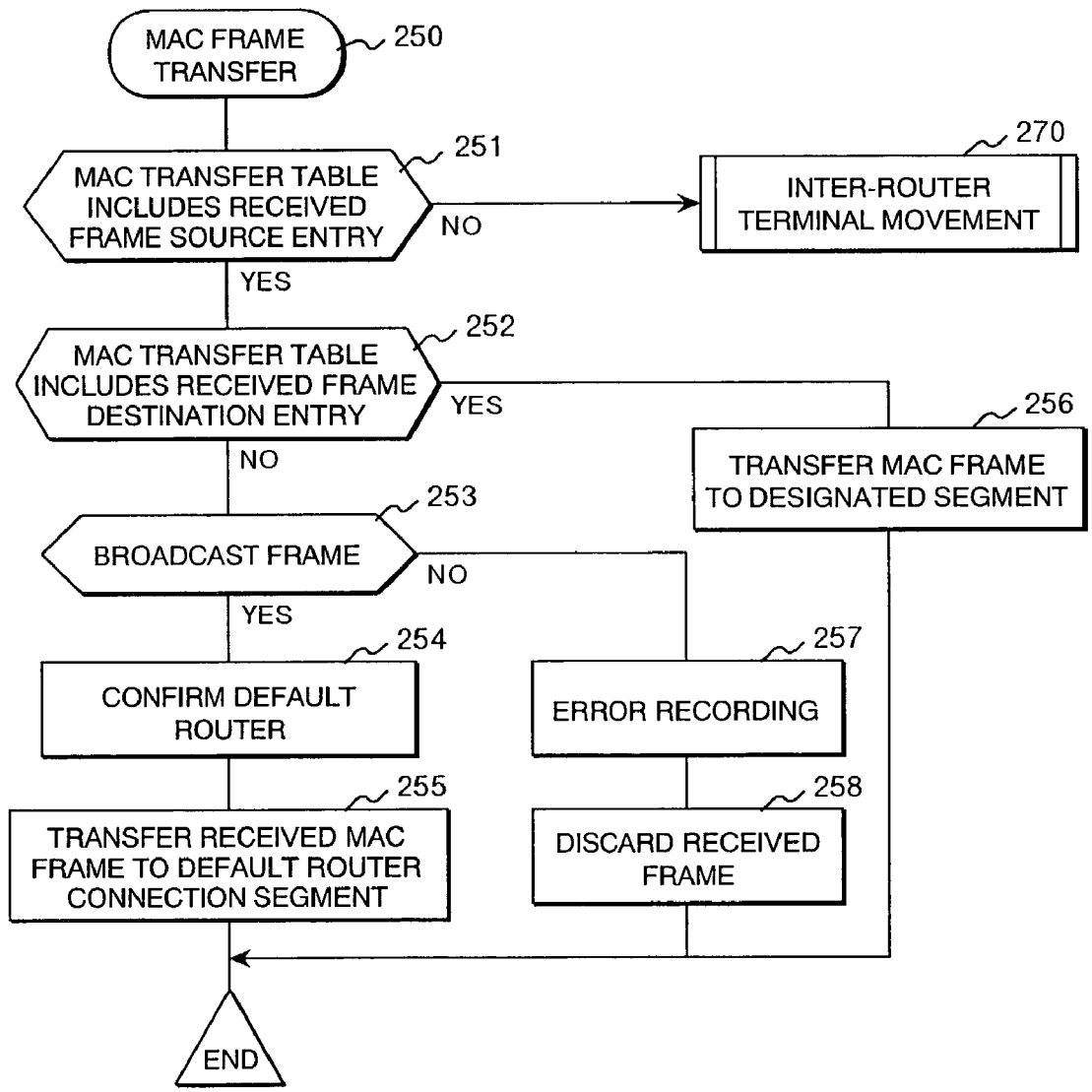
FIG. 17 is a flowchart showing the details of a MAC frame transfer processing 250 in FIG. 16.
Figure 18:
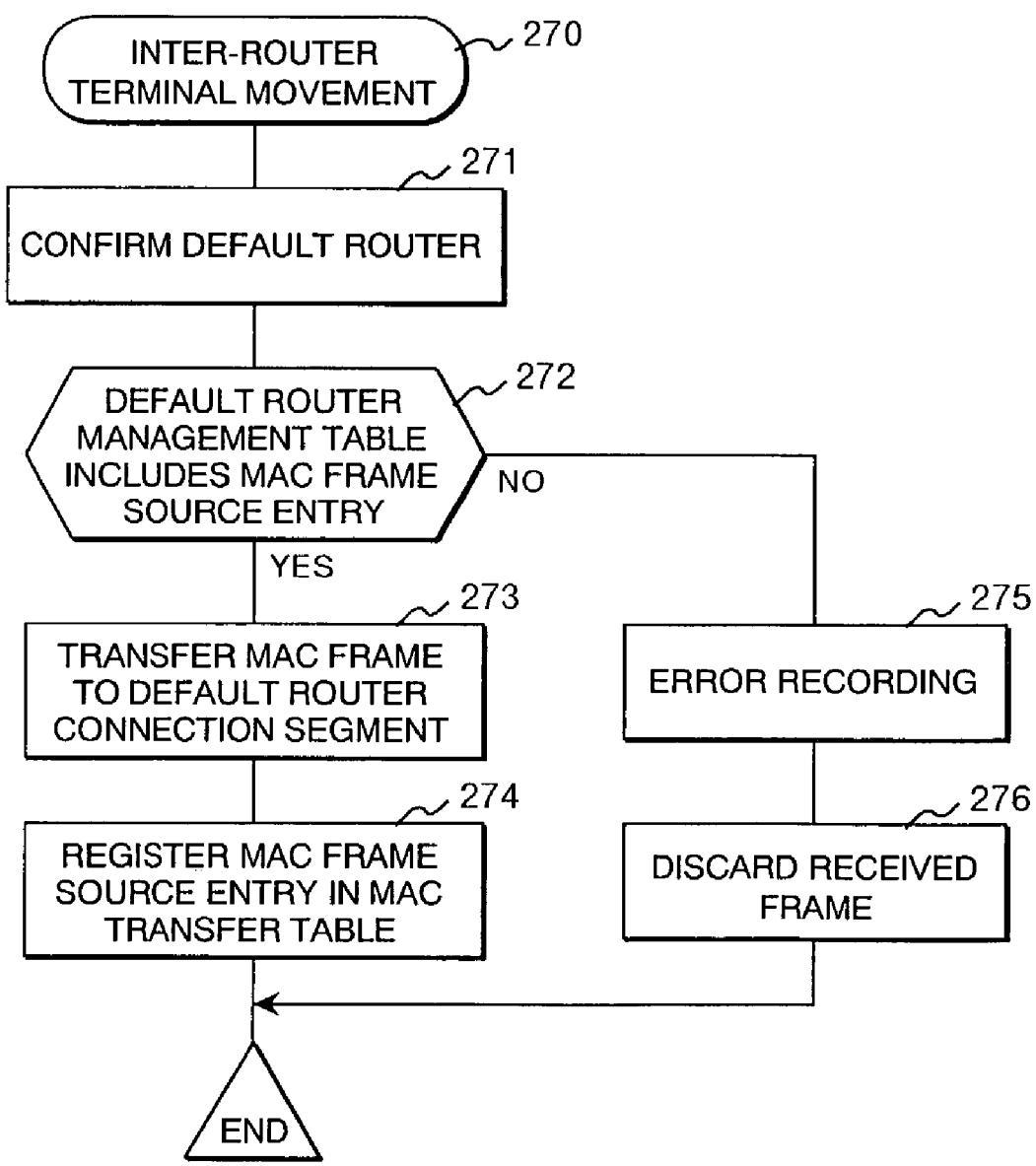
FIG. 18 is a flowchart showing the details of an inter-router terminal movement processing 270 in FIG. 16.

In the MAC frame transfer processing 250, as shown in FIG. 17, an entry of which MAC address 61 matches with the MAC address of the source terminal of the received frame is retrieved (251). If an entry matching with the source MAC address is not registered in the MAC transfer table 60, an inter-router terminal movement processing 270 which will be described later by referring to FIG. 18 is executed.

In the case where the entry matching with the source MAC address has not been registered in the MAC transfer table 60, an entry of which MAC address 61 matches with the MAC address of the destination of the received frame is retrieved from the MAC transfer table 60 (252). If an entry matching with the destination MAC address exists, the received MAC frame is transferred to an output port designated by the segment identifier 62 of the entry (256).

For example, in the case where the terminal **2*a* whose default router is the router 10A moves to the segment 3*d* connected to the router 10B and transmits a MAC frame of which destination MAC address indicates the default router 10A, if the entry of the terminal 2*a* has been registered in the MAC transfer table, the received MAC frame is transferred to the line 2*x* in the step 255**.

If the entry matching with the destination MAC address is not registered in the MAC transfer table 60, the router 10A determines whether the received frame is a broadcast frame or not (253). If the received frame is not a broadcast frame, after error recording (257), the received frame is discarded (258), and the routine is finished.

If the received frame is a broadcast frame, after inquiring of the default router management server 8 a default router corresponding to the source MAC address of the received frame (254), the router 10A transfers the received frame (MAC frame) to a segment connected to the default router (255).

When the source MAC address of the received frame is not registered in the MAC transfer table 60, the router 10A judges that the source terminal is moved in from another subnetwork, and executes the inter-router terminal movement processing 270.

In the inter-router terminal movement processing 270, as shown in FIG. 18, the router 10A inquires of the default router management server 8 a default router corresponding to the source MAC address of the received frame (271). When a response from the default router management server 8 indicates that an entry corresponding to the source MAC address is not registered in the default router management table 80 (272), after error log information recording (275), the received frame is discarded (276), and the routine is finished.

When the default router corresponding to the source MAC address is notified from the default router management server 8, the router 10A transfers the received frame (MAC frame) to a segment connected to the default router (273), register a new entry corresponding to the source MAC address in the MAC management table 60 (274), and terminates the routine.

By registering a new entry to the MAC transfer table 60, a MAC frame received thereafter from the same terminal can be transferred to the default router of the source terminal without inquiring of the default router management server the default router.

For example, in the network of FIG. 12, when the terminal **2*a*, whose default router (default gateway) is the router 10A, moves from the segment 3*a* to the segment 3*d* and sends a MAC frame of which destination indicates the MAC address of the router 10A to the segment 3*d*, the router 10B executes the MAC frame transfer processing 250 and the inter-router terminal movement processing 270 to thereby transfer the received MAC frame to a segment connected to the default router 10A of the terminal 2a notified from the default router management server 8, that is, the connection port of the line 3**x in the example.

By registering an entry for the terminal 2a in the MAC transfer table 60 in step 274, a MAC frame transmitted from the terminal 2a thereafter is transferred to the connection port of the line 3x in the MAC frame transfer processing 250. Therefore, even in the case where the terminal 2a having been communicating with the terminal 2b in the segment 3a performs communication with the terminal 2b after moving into the broadcast segment 3d, the user can start communication in a usual procedure without awareness of a change in the segment connected to the terminal 2a.

In the second embodiment, there is a case such that the router 10A (10B) receives an ARP request message also from a mobile terminal associated with the router 10B (10A) as its default router, other than terminals belonging to the subnetwork 3A under the route. For example, in the network of FIG. 12, in the case where the terminal 2d broadcasts an ARP request message designating the IP address of the terminal 2e to the segment 3c after movement, the router 10A has to transfer the received ARP request message to the router 10B so as to make the router 10B respond to the request as a proxy.

Figure 8:
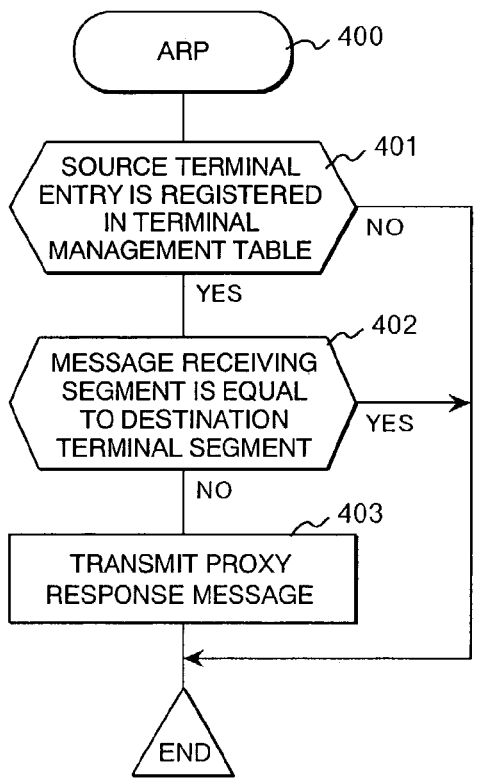
FIG. 8 is a flowchart showing an example of an ARP processing routine 400 executed by the router 10.

In order to realize such inter-router transfer of the ARP request message, for example, in the ARP processing routine 400 shown in FIG. 8, when it is determined in step 401 that the source terminal of a received message is not registered in the terminal management table, if the destination address of the received message is the broadcast address, that is, if the received message is an ARP request message, the router 10A executes a processing similar to the inter-router terminal movement processing 270 shown in FIG. 18. If the destination address is an individual terminal address other than the broadcast address, that is, in the case where the received message is a response message, the router 10A checks whether the destination address is registered in the MAC transfer table or not. When the destination address is registered, it is sufficient to transfer the received frame to the registered segment.

In such a manner, the router 10A can transfer the ARP request from the terminal 2d to the router 10B in a form of a MAC frame. When a response message generated from the router 10B by proxy of the destination terminal 2e is received from the line 3x, the response message can be transferred to the source terminal 2d of the ARP request message.

According to the second embodiment, each of the routers 10A and 10B has the function of communicating a MAC frame destined to the other router via the line 3x, so that the range of the subnetworks 3A and 3B of a multi-segment structure indicated by the solid lines in FIG. 12 can be substantially expanded to a range indicated by broken lines.

The routers 10A and 10B of the second embodiment function as routers independent from each other with respect to external subnetworks. For example, in the case of distributing routing information to the subnetwork 5a, the router 10A distributes the address "192.168.0.0/24" of the internal subnetwork 3A and the addresses of the external subnetworks (5b to 5n) other than the subnetwork 5a connected to the router 10A.

Similarly, the router 10B distributes the address "192.168.1.1/24" of the internal subnetwork 3A and the addresses of the external subnetworks (5b to 5n) other than the subnetwork 5a connected to the router 10B. This is unchanged also in the case where a terminal belonging to a subnetwork moves to a broadcast segment connected to the other router. As described above, by always dealing the routing information on a subnetwork unit basis irrespective of a physical location of terminals, a burden on the routing control function can be lessened.

Although the router 10 accommodates terminals via the multi-segment type internal subnetwork in the above embodiment, the router of the invention may be provided with a normal internal subnetwork of a single segment type, as internal subnetworks for terminal connection, in addition to the multi-segment type internal subnetwork. However, terminals belonging to the normal internal subnetwork are dealt like a terminal connected to an external subnetwork, so that these terminals can not receive the advantage of terminal movement according to the invention.

As described above, according to the invention, one subnetwork is comprised of a plurality of broadcast segments and a packet transfer apparatus automatically manages the corresponding relation of each terminal and a connection segment, so that movement of a terminal among segments is allowed without changing set values such as a terminal IP address and a default device address.

What is claimed is:

1. A packet transfer apparatus connected to a plurality of broadcast segments and having a packet transfer control unit for transferring IP packets among the segments, wherein an internal subnetwork having a subnetwork address is formed by a set of segments among said plurality of broadcast segments, each of which accommodates a plurality of terminals, said packet transfer control unit comprises:

a terminal management table for storing a plurality of entries each indicating a corresponding relation of a MAC address and an IP address of a terminal belonging to said internal subnetwork and an identifier of a segment to which the terminal is connected, means for transferring, when receiving from a source terminal connected to one of said set of segments in said internal subnetwork a MAC frame designating a destination terminal connected to one of said set of segments in said internal subnetwork by a destination IP address designating a destination terminal connected to another one of said set of segments in said internal subnetwork, an IP packet extracted from the received frame to the segment to which said destination terminal is connected by referring to said terminal management table, and said packet transfer control unit comprises:

a routing table in which a plurality of entries each indicating routing control information corresponding to the address of one of said subnetworks are registered, an entry corresponding to the address of said internal subnetwork registered in the routing table including a segment identifier indicating that the internal subnetwork is comprised of a plurality of segments, and means for specifying by referring to said routing table and said terminal management table, when an IP packet destined to a terminal belonging to said internal subnetwork is received from a segment connected to an external subnetwork, a segment to which a destination terminal is connected, thereby to transfer the received packet to the segment.

2. A packet transfer apparatus connected to a plurality of broadcast seaments, comprising:

a packet transfer control unit for transferring IP packets among the segments;

an internal subnetwork having a subnetwork address and formed by a set of segments among said plurality of broadcast segments, each of which accommodates a plurality of terminals; and table updating means for collating, when a MAC frame is received from a source terminal connected to one of said set of segments in said internal subnetwork, a first segment having received the MAC frame with a second segment whose identifier is indicated in one of entries stored in said terminal management table in correspondence with the MAC address of the source terminal of the MAC frame, and changing the identifier of the second segment stored in the terminal management table to that of the first segment when said two segments do not match with each other, by judging that the source terminal is moved within the internal subnetwork, wherein said packet transfer control unit comprises:

a terminal management table for storing a plurality of entries each indicating a corresponding relation of a MAC address and an IP address of a terminal belonging to said internal subnetwork and an identifier of a segment to which the terminal is connected, means for transferring, when receiving from a source terminal connected to one of said set of segments in said internal subnetwork a MAC frame designating a destination terminal connected to one of said set of segments in said internal subnetwork by a destination IP address designating a destination terminal connected to another one of said set of segments in said internal subnetwork, an IP packet extracted from the received frame to the segment to which said destination terminal is connected by referring to said terminal manaaement table.

3. The packet transfer apparatus according to claim 2, wherein said table updating means includes means for transmitting, when said first segment and said second segment are not the same, a confirmation message destined to the source address of said MAC frame to both of said first segment and said second segment and for determining whether the identifier of the second segment stored in said terminal management table has to be updated or not in accordance with a reception state of a response to said confirmation message in both of said first and second segments.

4. A packet transfer apparatus connected to a plurality of broadcast segments and for transferring IP packets among the segments, an internal subnetwork having a subnetwork address being formed by a set of segments among said plurality of broadcast segments, each of said set of segments accommodates a plurality of terminals, the packet transfer apparatus comprising:

a connection line for communicating MAC frames with an adjacent packet transfer apparatus being in joint relation;

a packet transfer control unit for transferring, when receiving from a source terminal connected to one of said set of segments in said internal subnetwork a MAC frame including a destination MAC address designating the packet transfer apparatus and a destination IP address designating a destination terminal connected to another one of said set of segments in said internal subnetwork, an IP packet extracted from the received frame to said segment to which said destination terminal is connected; and a MAC frame transfer control unit for transferring, when a MAC frame is received from a terminal associated with said adjacent packet transfer apparatus as a default apparatus via one of said set of segments in said internal subnetwork, the received MAC frame to said connection line connected to said adjacent packet transfer apparatus.

5. The packet transfer apparatus according to claim 4, wherein said packet transfer control unit includes a terminal management table for storing a plurality of entries each indicating a corresponding relation of a MAC address and an IP address of a terminal, which belongs to said internal subnetwork and is associated with the packet transfer apparatus as a default apparatus, and an identifier of a segment to which the terminal is connected, and means for controlling transfer of IP packets among said set of segments in said internal subnetwork in accordance with the terminal management table, and said MAC frame transfer control unit includes a MAC transfer table storing a plurality of entries each indicating a correspondence relation between a MAC address and a connection segment, and means for controlling transfer of a MAC frame to said adjacent packet transfer apparatus in accordance with the MAC transfer table.

6. The packet transfer apparatus according to claim 5, wherein said MAC frame transfer control unit transfers the MAC frame to said adjacent packet transfer apparatus and registers an entry for said source terminal into said MAC transfer table after confirming that the default apparatus of the source terminal is said adjacent packet transfer apparatus when an entry corresponding to the source terminal of said received MAC frame is not registered in said MAC transfer table, subjecting received MAC frames of which destination MAC address is a MAC address of an apparatus other than the packet transfer apparatus.

7. The packet transfer apparatus according to claim 4, further comprising means for determining, when an address request message inquiring a MAC address of a destination terminal by designating a destination IP address is received from a source terminal connected to one of said set of segments in said internal subnetwork, whether an entry corresponding to said source terminal is registered in said terminal management table and whether the segment connected to said destination terminal and a segment having received said address request message are the same by referring to said terminal management table, and transmitting, when the entry corresponding to the source terminal is registered and said segment connected to said destination terminal is different from the segment having received said address request message, a response message including the IP address of said destination terminal and the MAC address of the router to the segment connected to said source terminal by proxy of the destination terminal.

8. The packet transfer apparatus according to claim 7, wherein said packet transfer control unit comprises:

a routing table for storing a plurality of entries each indicative of routing control information in correspondence with an address of a subnetwork, an entry corresponding to an address of said internal subnetwork stored in said routing table including a segment identifier indicating that the internal subnetwork is comprised of a plurality of segments; and means for specifying by referring to said routing table and said terminal management table, when an IP packet destined to a destination terminal belonging to said internal subnetwork is received from a segment connected to an external subnetwork, a segment to which the destination terminal is connected, thereby to transfer the received packet to the segment.

9. The packet transfer apparatus according to claim 7, wherein said packet transfer control unit further includes table updating means for collating, when a MAC frame with a destination MAC address designating the packet transfer apparatus is received from a source terminal connected to one of segments in the internal subnetwork, a first segment having received the MAC frame with a second segment whose identifier is stored in said terminal management table in correspondence with the MAC address of the source of the MAC frame, and changing, when said first segment is different from said second segment, the identifier of the second segment stored in said terminal management table to that of the first segment by judging that the source terminal moves in the internal subnetwork.

10. The packet transfer apparatus according to claim 9, wherein said table updating means includes means for transmitting, when said first segment is judged different from said second segment, a confirmation message destined to the source address of said MAC frame to both of said first and second segments, and for determining whether the identifier of the second segment stored in said terminal management table has to be updated or not in accordance with a reception state of a response to said confirmation message in both of said first and second segments.

* * * * *